United States Patent [19]

Mayhan et al.

[11] 4,311,573

[45] Jan. 19, 1982

[54] PROCESS FOR GRAFT COPOLYMERIZATION OF A PRE-FORMED SUBSTRATE

[75] Inventors: Kenneth G. Mayhan; Robert A. Janssen, both of Irvine; William J. Bertrand, Sunnymeade, all of Calif.

[73] Assignee: American Hospital Supply Corporation, Evanston, Ill.

[21] Appl. No.: 195,103

[22] Filed: Oct. 8, 1980

[51] Int. Cl.$^3$ .............. C08F 2/10; C08F 291/18; C08F 291/06; C08J 7/16

[52] U.S. Cl. .............. 204/159.15; 204/159.13; 204/159.16; 204/159.17; 260/4 R; 260/17 A; 260/174 GC; 525/245; 525/246; 525/247; 525/262; 525/421; 525/445; 525/455; 525/468; 525/479; 525/529; 525/904

[58] Field of Search ............ 204/159.13, 159.15, 204/159.16; 260/4 R, 17 A, 17.4 GC; 525/262, 245, 246, 247, 421, 455, 468, 529, 479, 904

[56] References Cited

U.S. PATENT DOCUMENTS

| | | | |
|---|---|---|---|
| 3,008,920 | 11/1961 | Urchick | 260/45.5 |
| 3,070,573 | 12/1962 | Beck | 260/45.5 |
| 3,107,206 | 10/1963 | Cottet | 204/154 |
| 3,453,194 | 7/1969 | Bennett | 204/159.12 |
| 3,700,573 | 10/1972 | Laizier | 204/159.13 |
| 3,959,102 | 5/1976 | Wajs | 204/159.13 |
| 4,099,859 | 7/1978 | Merrill | 351/160 |

OTHER PUBLICATIONS

Chapiro, J. Polymer Sci.: Symposium No. 50, 181-188 (1975).

O'Neill, T., J. Polymer Sci.: Part A-1, vol. 10, 569-580 (1972).

Cohen, S., J. R. Lacher and J. B. Park, J. Am. Chem. Soc. 81:3480 (1959).

West, R., and D. L. Powell, J. Am. Chem. Soc. 85:2577-9 (1963).

Maahs, G., and P. Hegenberg, Angen. Chem. Int. Ed. 5:888-93 (1966).

Sprenger, H. E. and W. Ziegenbein, A&GW. Chem. Internat. Edit., 7:530-5 (1968).

West, R., H. Y. Niu and M. Ito, J. Am. Chem. Soc. 85:2589-86, 85:2589-90 (1963).

Tedesco, P. H. and H. F. Walton, Inorganic Chemistry, 8:9327 (1969).

*Primary Examiner*—Carman J. Seccuro
*Attorney, Agent, or Firm*—Tilton, Fallon, Lungmus

[57] ABSTRACT

A process for modifying the surface characteristics of a pre-formed polymeric substrate to impart hydrophilicity, hydrophobicity, or other desired properties thereto, by peroxidizing the surface of the substrate and then allowing the active sites along the polymer chains to generate free radicals which induce graft polymerization of a suitable ethylenic monomer (or other ethylenically-unsaturated compound) onto the surface of the substrate is described. Such graft copolymerization is undertaken in the presence of variable valence metal ions in a reduced state under acidic conditions and at selected reaction times and relatively low temperatures, and in the presence of squarate ions (diketocyclobutenediol) to control the physical characteristics of the surface graft and to restore the metal ions to their lower valence state without at the same time producing deleterious by-products.

18 Claims, No Drawings

PROCESS FOR GRAFT COPOLYMERIZATION OF A PRE-FORMED SUBSTRATE

BACKGROUND AND SUMMARY

Procedures have been known in the past for graft copolymerizing various monomers onto radiation-peroxidized polymers. Various solid or semi-solid polymeric substrates have been used, including polyethylene, polypropylene, polymethylmethacrylate, silicone rubber, polycarbonates, polyesters, natural and synthetic rubbers, polyurethanes, polyamides, cured epoxy resins, cellulosics, polyvinyl chloride formulations, polystyrene, natural fibers and various copolymers. The basis for some of the reported work was reported by Chapiro, J. Polymer Sci.:Symposium No. 50, 181–188 (1975). The grafting monomer may be any ethylenically-unsaturated compound capable of free radical polymerization. Refer to U.S. Pat. No. 3,008,920.

The technique may involve the preirradiation of a polymer with ionizing radiation in the presence of oxygen to build up a population of peroxides in and on the polymer, followed by a heat treatment of the peroxidized polymer in the presence of an appropriate monomer. While peroxidation of the polymer would typically result from subjecting the polymer to high energy ionizing radiation (gamma ($\gamma$) rays, or high energy electrons produced by a particle accelerator), other methods of peroxidizing the polymeric substrate, such as ozonization, may be used. (Refer to U.S. Pat. Nos. 3,008,920 and 3,070,573).

In theory, graft polymerization onto the surface of an article formed of a solid or semi-solid polymer appears highly desirable because it may give rise to modification of the surface properties of the substrate without causing major changes in the physical characteristics of the substrate as a whole. For example, medical devices are often formed of organosilicone compounds, particularly silicone rubber, because of the relative physiological inertness, high permeability to gases such as oxygen and carbon dioxide, and thermal stability. However, such materials are also hydrophobic. There is evidence to indicate that hydrophobic polymers are less biocompatible and less thromboresistant than hydrophilic polymers but, unfortunately, hydrophilic polymers are generally characterized by relatively low physical strength in aqueous environments. An objective, therefore, would be to render hydrophilic, by means of graft polymerization, only the surface of an article formed of silicone rubber or some other suitable substrate polymer.

In practice, processing complications have interfered with the realization of such an objective. One such complication involves simultaneous homopolymerization of the monomer bath along the formation of the surface grafts; however, it has been indicated that such homopolymerization may be minimized by incorporating a metal redox system to convert the hydroxyl radical to hydroxyl ion. O'Neill, T., J. Polymer Sci.:Part A-1, Vol. 10, 569–580 (1972).

Another complication in the surface grafting of a preformed polymeric substrate concerns depth control of the graft. If the bulk properties of the substrate are to be retained, then the graft depth should be no greater than necessary to alter only the surface characteristics of the article. Past efforts, in our laboratories, to graft polymerize only the surface of an article has generally been frustrated by the development of a graft of excessive depth. The swelling and degrading of the article as a whole, and/or the formation of a graft of insufficient density was often encountered.

Accordingly, it is an object of this invention to provide a graft polymerization process for modifying the surface characteristics of a pre-formed solid or semi-solid polymeric substrate wherein homopolymerization is inhibited and graft depth and density may be effectively controlled. It is a further object to provide a process in which the agent for inhibiting homopolymerization also functions to accelerate graft polymerization, and in which a complexing agent is utilized for controlling the depth and density of the graft and for regenerating the homopolymerization inhibitor. The result is a process which promotes the conservation of monomer, permitting a monomer bath to be used successively in treating a plurality of polymeric articles for the purpose of modifying the surface characteristics of such articles.

In brief, the process involves the surface treatment by graft polymerizing techniques of a solid or semi-solid polymeric substrate having peroxide groups, including hydroperoxide groups, at the surface thereof. An agent which functions both as an accelerator and as a homopolymerization inhibitor, in particular, an agent which provides a source of ferrous ions or other variable valence metal ions in their reduced state, prevents the development of free radicals in solution by a redox mechanism which also results in the formation of higher valence (e.g., ferric) ions. Graft depth is controlled to a major extent by regulating pH and/or salt concentrations, and particularly by the inclusion of an agent, squaric acid, which complexes with the ferrous ions to limit the mobility of such ions in terms of surface penetration.

An important aspect of this invention lies in the discovery that squaric acid, a compound first synthesized in 1959 and not heretofore known to have significant practical uses, is uniquely effective as an additive in graft polymerization processes, functioning not only as a complexing agent for limiting the extent of penetration of the metal ions into the substrate, and thereby controlling the depth of graft formation, but also functioning to regenerate the ferric ions (or other metal ions) to their lower valence state. Such functions are performed without interferring with the activity of lower valence metal ions as inhibiting homopolymerization and initiating or acclerating surface graft copolymerization, and without producing any deleterious by-products (only carbon dioxide and hydronium ions are generated).

Literature reporting on squaric acid and the squarate ion (diketocyclobutenediol and its dianion) is limited, and includes Cohen, S., J. R. Lacher, and J. B. Park, J. Am. Chem. Soc. 81:3480 (1959); West, R., and D. L. Powel, J. Am. Chem. Soc. 85:2577–9 (1963); Maahs, G., and P. Hegenberg, Angen. Chem. Int. Ed. 5:888–93 (1966); Sprenger, H. E. and W. Ziegenbein, A&GW. Chem. Internat. Edit., 7:530–5 (1968); West, R., H. Y. Niu and M. Ito, J. Am. Chem. Soc. 85:2584–86 (1963); West, R., and H. Y. Niu, J. Am. Chem. Soc. 85:2589–90 (1963); and Tedesco, P. H., and H. F. Walton, Inorganic Chemistry, 8:932–7 (1969). Other references disclosing the state of the art are Pat. Nos. 3,453,194, 3,107,206, 4,099,859, 3,700,573, and 3,959,102.

DETAILED DESCRIPTION

The pre-formed substrate to be treated by the process of this invention may be any of a wide variety of solid or semi-solid polymers, the surface of which, upon being subjected to high energy ionizing radiation or ozonization, yields peroxides. The high energy ionizing radiation may take the form of γ-rays or high-energy electrons produced by a particle accelerator, all as known in the art. Peroxidation of the substrate occurs when such irradiation occurs in an oxygen-containing environment. Where the peroxidation is to be produced by ozonization, the polymer substrate is treated with a gaseous atmosphere containing ozone, again as noted in the aforementioned prior art. The extent of treatment may vary considerably depending on the substrate selected and the morphology of the graft sought to be produced. In the case of ozonization, the gaseous atmosphere should contain a sufficient volume of ozone to obtain the desired results. Peroxidation by means of ozonization would of course be limited to those substrates which do not degrade rapidly in the presence of ozone. For example, rubbers, whether natural or synthetic, which contain unsaturation as a part of their structure degrades quickly when exposed to ozone; hence, for such substrates, peroxidation by high energy ionizing radiation is far more effective than ozonization.

Examples of suitable polymeric substrates include both synthetic and natural polymers such as polyethylene, polypropylene, polymethylmethacrylate, silicone rubber, polycarbonates, polyesters, natural and synthetic rubbers, polyurethanes, polyamides, cured epoxy resins, cellulosics, polyvinyl chloride formulations, polystyrene, natural fibers and various copolymers. While the substrate may take the form of a sheet, film, fiber or powder, ordinarily it will take the form of a shaped or substantially-finished article which has both the desired configuration and bulk characteristics but requires some modification of its surface properties. It may be desirable, for example, to alter the physical, chemical, mechanical, and biological properties of the surface of the substrate without, at the same time, substantially modifying the basic or bulk properties of that substrate in order to impart a more lubricious surface to the pre-formed substrate, to render its surface more hydrophilic (or increase the hydrophilicity of the surface), to increase bondability or to provide a chemical means of immobilizing enzymes or other chemical species.

The peroxidized substrate, following irradiation or ozonization, will have peroxide groups on its surface, such groups including hydroperoxides. There are two basic peroxide-forming reactions that generally occur during peroxidation, one being the formation of a diperoxide and the other being the formation of a hydroperoxide. The reactions are summarized by equations (1) and (2) as follows:

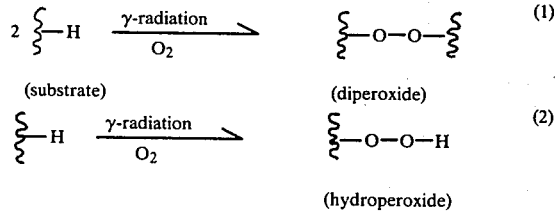

The thermal decomposition of the peroxides formed from equations (1) and (2) result in different radical fragments which initiate polymerization. This is summarized by equations (3) and (4), where M represents the monomer.

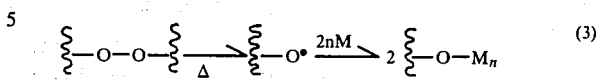

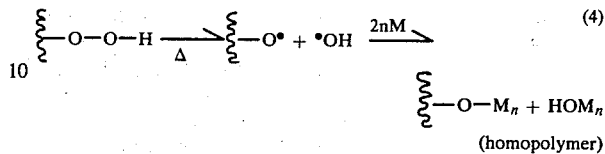

Equation (3) shows that the thermal cleavage of the diperoxide results in two active free radicals which initiate graft polymerization with the monomer. On the other hand, the thermal cleavage of a hydroperoxide, as equation (4) shows, results in one active free radical on a polymer chain capable of initiating graft polymerization and one free hydroxyl radical. It is the hydroxyl radical that initiates homopolymerization of the monomer unless such homopolymerization is somehow inhibited or suppressed.

An effective homopolymerization-inhibiting agent has been found to be ferrous ion, although other variable valence metal ions are believed capable of complexing with and of being potentially reduced by squaric acid. Those of cobalt manganese, molybdenum, tin and indium have been found to be reduced from their oxidized (-ic) state to their reduced (-ous) state. Other metal ions, such as cerium, chromium, thallium, and vanadium, may be reduced in the presence of squaric acid but at a greatly reduced rate. Any suitable metal salt may provide the source of the metallic ions; in the case of ferrous ions, a preferred source is ferrous ammonium sulfate, although other ferrous salts such as ferrous sulfate, ferrous chloride, ferrous iodide and ferrous bromide may be effectively employed.

The mechanism for inhibiting homopolymerization is illustrated by the following equation (5) in which a lower valence metal ion, ferrous ion, is used to react with the hydroxyl radical in a redox system to produce hydroxyl ion. This hydroxyl ion can then no longer initiate free radical polymerization.

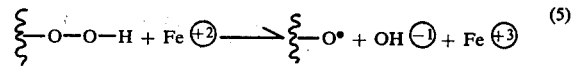

In addition to inhibiting homopolymerization by converting free hydroxyl radicals to hydroxyl ions, the metal ion in its lower valence state also functions as an accelerator of initiation. Migration of such ion into the substrate therefore tends to increase the depth of the graft. By including an agent capable of complexing with the lower valence ion in the monomer bath, the extent of penetration of that ion and the depth of graft formation may be more effectively controlled.

Squaric acid appears to be unique in that when it is utilized with the lower valence metal ion in the presence of some water soluble monomers it allows such metal ion to react, controls the depth of the surface graft and allows the conversion of the -ic to the -ous complex, thus establishing the basis for a continual usage polymer grafting bath. Agents forming iron complexes having stability constants lower than squaric acid (log K=3-4), such as malonic acid, have not been found effective in controlling graft depth nor of regenerating the lower valence metal ions. Other complexing agents producing complexes having about the same stability constant as squaric acid have been found ineffective; in some instances they have formed precipitates in the presence of certain water soluble monomers and, in other cases, they have poisoned the polymerization reactions. Materials such as pyridine dicarboxylic acids, oxalic acid, quinaldic acid, 5 nitro-1, 10 phenantholine fall into this category. Complexes having higher stability constants (log K=10) have been found to complex the lower valence metal ions to the extent that such ions are unavailable for redox reactions.

Although an exact and rigorous explanation of the unique action of squarate ion in these systems is not presently available, it is believed that squaric acid-metal ion (both -ic and -ous) complexes exist as weakly bound polymeric entities in solutions. Because of this property their effective ionic diameters are considerably larger than those formed by other metal ion complexers. In addition, the stability constant of the metal ion (-ous)-squaric acid complex is low enough to allow the metal ion to undergo redox reactions at substrate surfaces while the size of the complex prevents penetration of the lower valence species into the interstices of the substrates.

Squaric acid and the squarate ion (diketocyclobutenediol and its dianion) are not only capable of complexing with the metal ions but, in addition, function as a reducing agent to regenerate the lower valence metal ion from its higher valence state. The overall stoichiometric reaction is illustrated by the following equation (6):

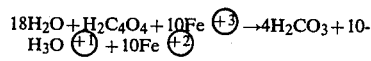

(6)

The following equilibrium is assumed:

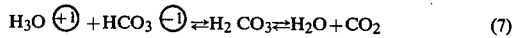

(7)

Using a ferrous-ferric system for purposes of illustration, the general sequential mechanism involved is believed to be:

(8)

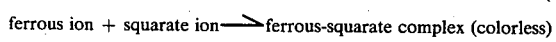

(9)

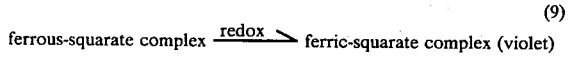

(10)

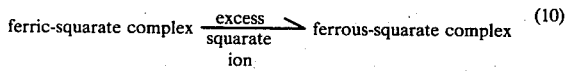

Regeneration of the lower valence state metal ion occurs without the production of by-products that might interfere with subsequent grafting procedures utilizing the same monomer bath. Consequently, articles to be treated for alteration of their surface properties through graft copolymerization may be successively exposed to the same monomer bath. Homopolymerization of the monomer is inhibited by the metal ions in their lower valence state, through a redox system in which such ions are converted to their higher valence, and the squarate ion then reacts to reduce the metal ions back to their lower valence state. Complexing of the lower valence ion by the squarate ion does not materially reduce the effectiveness of the lower valence metal ion as an accelerator capable of lowering the activation energy of the initiation reaction nor does it significantly reduce the availability of the lower valence ion as a homopolymerization-inhibiting agent. However, as already indicated, such complexing of the -ous ion does tend to impair penetration into the substrate, thereby helping to limit graft copolymerization to the surface of the substrate article exposed directly to the monomer bath.

It is to be emphasized that the by-products of reaction (6), within the concentration ranges used, are non-deleterious to the process and the grafting reaction and are non-toxic. Such considerations are of obvious importance in the surface alteration of a wide variety of products, and are essential where the substrate takes the form of a medical product expected to come into direct contact with living tissue.

The monomer used in the graft polymerization may be any of a wide variety of ethylenically unsaturated compounds, the particular selection depending primarily on the surface properties sought. Among suitable monomers capable of free-radical polymerization under the conditions set forth are methacrylamide, sodium methacrylate, citraconic acid, methylolacrylamide, 2-hydroxyl ethyl acrylate, potassium acrylate, sodium acrylate, calcium acrylate, cobalt acrylate, 2-acrylamido-2-methyl propane sulfonic acid, acrylamide, HEMA (2-hydroxy-ethyl methacrylate), GMA (Glycidylmethacrylate), vinyl pyrollidione, styrene, acrylic acid, methacrylic acid. The monomer-solvent system must be such that the metal ions and squaric acid are soluble and such that equations (5) and (6) are obeyed. Best results are obtained with water soluble monomers and water soluble solvent systems.

The grafting reaction should be carried out in an oxygen free environment at temperatures and pressures selected to maintain the monomer in solution, such temperatures generally falling with the range of 0° to 150° C. The reaction temperatures more commonly fall within the range of 20° to 100° C. The reaction temperatures selected, the reaction times used, and the concentration of monomer and other reactants may be varied considerably depending upon monomer and substrate composition, the extent of pre-irradiation, and the particular surface properties sought by the graft polymerization. The metal ion concentration may be calculated on a stoichiometric basis for insuring completeness of reaction to convert all of the hydroxyl radical to hydroxyl ion (the particular concentration depending on the particular variable-valence metal ion selected) and should not be in substantial excess of the concentration needed to produce a graft having the desired characteristics. The squarate ion concentration may also be calculated and should be moderately in excess of that needed to regenerate all of the metal ion to its lower valence state.

The pH of the reaction mixture should be acidic with lower pH values tending to promote thinner grafts of greater density. The optimum pH in any given system will depend largely upon the particular substrate and monomer selected, and the graft depth, density, and properties sought to be achieved but, in general, the pH of the reaction should be maintained in the general range of approximately 1 to 6. The degree of swelling that the subsurface layers of the substrate experience is determined by the monomer-substrate interactions. These, in turn, depend upon the ionic environment of the grafting solution, which has been shown to be a function of pH.

The addition to the monomer bath of a salt such as sodium chloride, potassium chloride, sodium sulfate, or potassium sulfate, or other neutral salt which is stable at the selected pH range and is preferably the salt of a strong acid and strong base, when combined with pH adjustment, has also been found effective in controlling graft depth, density, and thickness. It has been observed that, as salt concentration is increased, the clarity of the graft improves. It is believed that the salt ions may tend to compromise possible polyelectrolyte effects produced in the monomer bath. Salt concentrations may be varied within the solubility limits for the particular salt involved, with higher concentrations tending to decrease graft thickness. Any suitable base (sodium hydroxide, potassium hydroxide, or the like) may be added as the reaction proceeds to offset the increased acidity caused by the complexing reaction (see equation (6). If desired, suitable buffers may be used to maintain the selected pH of the monomer bath.

Where the monomer bath is used for grafting successive substrate articles, the squaric acid content of the bath must be replenished since, as shown in equations (6) and (7), squaric acid is consumed in the process, being converted to carbonic acid and hydronium ion.

The process of this invention is further revealed by the following illustrative examples:

EXAMPLE 1

A monomer bath continuously purged free of oxygen was prepared with 4.0 g acrylamide (Aldrich), 0.1 g ferrous ammonium sulfate hexahydrate (Mallinckrodt), and 0.1 g squaric acid dissolved in 36.0 g distilled deoxygenated water. The resulting solution pH was 2.5. The solution was heated to 50° C. while being constantly purged with nitrogen. Two sections approximately 3.8 cm in length of formulated polyvinyl chloride catheter tubing (Edwards Laboratories), pre-irradiated in air by $\gamma$-radiation to a total dose of 2.5 to 2.8 Mrads in a commercial irradiation facility, were introduced into the grafting solution bath and allowed to react for four hours. Inspection of the treated samples revealed a thin uniform hydrophilic and lubricious hydrogel graft over the surfaces of the samples. No homopolymerization of the bath was observed. Similar results were observed when the monomer bath was purged with carbon dioxide instead of nitrogen. It should be noted that some additives in formulated polyvinyl chlorides will inhibit the desired reaction and that this assessment must be made prior to carrying out the grafting reaction. Specifically, it has been shown that Ferro 760X) Ferro Chemical Corp.) will inhibit the polymerization.

EXAMPLE 2

Procedures similar to those of Example 1 were carried out at different pH levels to determine the effects of pH on the grafting reaction. Five monomer baths were prepared by dissolving 4.0 g acrylamide, 0.1 g ferrous ammonium sulfate hexahydrate, and 0.05 g squaric acid in 36 g distilled and deoxygenated water. Of the five tubes, one was adjusted to pH 1 with 10% sulfuric acid and the other four were adjusted to pHs 3, 5, 7 and 9 with 5.0 N sodium hydroxide. Five centimeter sections of formulated polyvinyl chloride catheters, preirradiated by $\gamma$-radiation in air to a total dose of 2.5 Mrads, were introduced into the grafting solutions while such solutions were maintained at 50° C. and constantly purged free of oxygen with nitrogen. The reactions were allowed to proceed for two hours. No visible changes, and specifically no evidence of homopolymerization, occurred in any of the baths during the reaction period. Following treatment in the monomer bath, the catheter samples were examined and were stained (methylene blue) to estimate the density of the grafts and extent of hydrophilicity. The catheter specimen from the tube adjusted to pH 1 was grafted with an extremely thin dense layer of polyacrylamide; pH 3 yielded a thin graft; pH 5 gave the heaviest graft (of low density); pH 7 gave a dense thin graft that tended to penetrate the substrate and pH 9 yielded a thin sparse graft.

EXAMPLE 3

Another monomer bath was prepared which has the same composition as previously described except it had double the squaric acid concentration. Instead of adding 0.05 g of the acid, 0.10 g was introduced. Also the solution had no pH adjustment. This composition produced a solution pH of 2.5. Grafting conditions were then duplicated as previously described. The reaction was allowed to proceed for four hours. At the conclusion of the reaction a thin, uniform surface limited graft was obtained as evidenced by staining. The nature of this graft was superior to any obtained by adjusting the pH of the grafting solution (see Example 2).

EXAMPLE 4

The grafting of a hydrophilic polyacrylamide layer onto the outer surfaces of polyethylene, formulated poly (vinyl chloride), and silicone rubber substrates was achieved as follows. All of the substrates were in the form of tubing, the poly (vinyl chloride) tubing being monolumen 7 French catheter tubing, the polyethylene tubing being radiopaque of 0.18 cm I.D. and 0.24 cm O.D., and the silicone rubber tubing being of 0.13 cm I.D. and 0.22 cm O.D. All tubular substrates were pre-irradiated by $\gamma$-radiation in air to a total dose of 2.5 Mrads. Multiple substrate samples were provided for grafting of each type of substrate in three different monomer baths. Bath A was prepared by dissolving 30 g acrylamide and 0.75 g ferrous ammonium sulfate hexahydrate in 270 g water, and then adding sulfuric acid (10%) dropwise until pH 3 was reached. Solution B was prepared exactly as the first solution except that 0.015 g N', N'-methylenebisacrylamide was added as a crosslinking agent. Solution C was prepared like solution A except that no sulfuric acid was added. The grafting solutions, each totaling 300 g, were divided into three 100 milliliter vessels so that sections of each of the three different tubular substrates could be grafted in the different monomer baths. The tubular substrates were cut into sections and introduced into the respective grafting vessels after they had been purged for approximately 10 minutes with nitrogen. The nitrogen was left flowing through the tubular substrates as they were lowered into the grafting solutions to preclude the possibility of monomer solutions entering the lumens. Nitrogen purging was continued through the grafting process. The substrates were grafted at 50° C., the reaction time for the formulated poly (vinyl chloride) samples being one hour, the time for the polyethylene samples being three hours, and the time for the silicone rubber samples being five hours. After treatment, the catheter sections were removed from the monomer baths and placed in one liter of distilled water to soak. No homopolymerization was observed in any of such procedures, and in all cases hydrophilic grafts were obtained. The squaric acid was effective in confining the grafts to the substrate surfaces whereas without squaric acid the grafts penetrated such surfaces to a substantially greater extent.

EXAMPLE 5

A bath was prepared with 0.1 g ferric ammonium sulfate dodecahydrate in 36.0 g distilled deoxygenated water. Another solution was prepared as the one described, plus it contained 0.1 g of squaric acid. Both solutions were kept at 50° C. for three days with a continuous purge of nitrogen. At the end of three days 4.0 g of acrylamide was added to each of the solutions. Three inch sections of poly (vinyl chloride) tubes, pre-irradiated by $\gamma$-radiation in air to a total dose of 3.3 Mrads, were introduced into the grafting solutions. Each tube had a continuous purge of nitrogen through its lumen. The reactions were allowed to proceed for three hours at 50° C. Inspection of the tube in the monomer solution without the squaric acid revealed a non-grafted hydrophobic surface. However, the tube that was in the monomer solution with the squaric acid showed that grafting had occurred as was evidenced by a lubricious, hydrophilic surface, thereby demonstrating the regenerative ability of the squaric acid to form ferrous ions from ferric ions as summarized by equation (6). Also, the squaric acid-ferrous ion complex stabilized the solution from oxidizing the ferrous ion to the ferric species upon contact with atmospheric oxygen. A similar experiment wherein air was bubbled through aqueous solutions of ferrous ammonium sulfate hexahydrate, one with and the other without squaric acid added, showed that the solution containing only the ferrous ammonium sulfate hexahydrate was radidly converted to the ferric species whereas the solution containing the squaric acid was substantially unaffected.

EXAMPLE 6

Five different monomer baths, continuously purged free of oxygen, were prepared with 36.0 g distilled deoxygenated water, 0.1 squaric acid and 0.1 g ferrous ammonium sulfate hexahydrate. Of the five baths, solution A had 4.0 g hydroxy ethyl methacrylate added; solution B had 4.0 g vinyl pyrrolidone added; solution C had 4.0 g 2-acrylamido-2-methyl propane sulfonic acid added; solution D had 4.0 g citraconic acid added; and solution E had 4.0 g methyl acrylamide added. Three inch sections of poly (vinyl chloride) tubes, preirradiated by $\gamma$-radiation in air to a total dose of 3.3 Mrads, were introduced into the grafting solutions. The reactions were allowed to proceed for 16 hours at 50° C. and constantly purged with nitrogen. Inspection of the poly (vinyl chloride) tubes showed that grafting had occurred with all the monomers, as was evidenced by stain retention (methylene blue).

EXAMPLE 7

A monomer bath continuously purged free of oxygen was prepared with 4.0 g acrylamide, 0.1 g ferrous ammonium sulfate hexahydrate, and 0.1 g squaric acid dissolved in 36.0 g distilled deoxygenated water. To this solution was added sodium chloride to a concentration level of 2.0 Molar. The solution was heated to 50° C. while being constantly purged with nitrogen. A three inch section of poly (vinyl chloride) tube, pre-irradiated by $\gamma$-radiation in air to a total dose of 3.3 Mrads, was introduced into the grafting solution. The reaction was allowed to proceed for 16 hours at 50° C. and constantly purged with nitrogen. Inspection of the poly (vinyl chloride) tube shows that grafting had occurred, as was evidenced by a lubricious, hydrophilic surface. The graft was confined to the surface and had greater density and clarity than grafts formed without the presence of salt.

EXAMPLE 8

Four different monomer baths, continuously purged free of oxygen, were prepared with 4.0 g acrylamide, 0.1 g squaric acid dissolved in 36.0 g distilled deoxygenated water. Of the four baths, solution A had 0.1 g ferrous ammonium sulfate hexahydrate added; solution B had 0.0293 g manganous carbonate added; solution C had 0.0742 g cobaltous nitrate added; and solution D had 0.0252 g cuprous chloride added. Three inch sections of poly (vinyl chloride) tubes, pre-irradiated by $\gamma$-radiation in air to a total dose of 3.3 Mrads, were introduced into the grafting solutions. The reactions were allowed to proceed for 16 hours at 50° C. and constantly purged with nitrogen. Inspection of the poly (vinyl chloride) tubes showed that grafting had occurred in solutions A, B, and C, as was evidenced by stain retention (methylene blue) without homopolymerization of the bath. The tube from solution D was not observably grafted.

While in the foregoing we have disclosed an embodiment of the invention in considerable detail for purposes of illustration, it will be understood by those skilled in the art that many of these details may be varied without departing from the spirit and scope of the invention.

We claim:

1. A process for producing a graft copolymer which comprises the graft polymerization of an ethylenically-unsaturated compound, in solution, with a substantially insoluble pre-formed solid or semi-solid polymeric substrate having peroxide groups, including hydroperoxide groups, along the polymer chains thereof, wherein the improvement comprises carrying out said polymerization in the presence of a variable valence metal ion in a reduced state capable of oxidizing to convert free hydroxyl radical to hydroxyl ion and thereby suppress homopolymerization of said monomer in said solution, said solution also containing squaric acid (diketocyclobutenediol and its ionized form) in a concentration sufficient to reduce said metal ion from its oxidized state and of complexing with said ion in its reduced state.

2. The process of claim 1 in which said ethylenically-unsaturated compound is water soluble and said solution is aqueous.

3. The process of claim 2 in which there is the further step of maintaining said solution at a substantially constant acidic pH and at selected reaction time and temperatures to control the depth of graft polymerization into the surface of said pre-formed polymeric substrate.

4. The process of claim 3 in which said solution is maintained at a substantially constant acidic pH by neutralizing the increase in acidity developed when said squaric acid reduces said metal ion.

5. The process of claim 4 in which said solution is maintained at a pH within the range of about 1 to 6.

6. The process of claims 1, 2 or 3 in which said preformed polymeric substrate is removed from said solution after graft copolymerization has occurred upon the surfaces thereof exposed to said solution, and a second pre-formed polymeric substrate having peroxide groups, including hydroperoxide groups, along the polymer chains thereof is introduced into said solution to graft copolymerize said monomer onto the surfaces thereof.

7. The process of claims 2, 3, 4 or 5 in which said solution also contains a neutral salt dissolved therein.

8. The process of claim 7 in which said salt is the salt of a strong acid and strong base.

9. The process of claim 1 in which there is the preliminary step of treating said pre-formed polymeric substrate with high energy ionizing radiation or ozonation to produce said peroxide groups.

10. A process for producing a graft copolymer which comprises the graft polymerization of a water-soluble ethylenically-unsaturated compound, in aqueous solution, with a substantially insoluble pre-formed solid or semi-solid polymeric substrate having peroxide groups, including hydroperoxide groups, along the polymer chains thereof, wherein the improvement comprises carrying out said polymerization in the presence of a variable valence metal ion in a reduced state capable of oxidizing to convert free hydroxyl radical to hydroxyl ion and thereby suppress homopolymerization of said monomer in said solution, said variable valence metal ion being selected from the group consisting of the ions of cobalt, manganese, iron, tin, molybdenum, and indium in their reduced states, said solution also containing squaric acid in a concentration sufficient to reduce said metal ion from its oxidized state and of complexing with said ion in its reduced state.

11. The process of claim 10 in which there is the further step of maintaining said solution at a substantially constant acidic pH and at a selected reaction time and temperatures to control the depth of graft polymerization into the surface of said pre-formed polymeric substrate.

12. The process of claim 11 in which said solution is maintained at a substantially constant acidic pH by neutralizing the increase in acidity developed when said squaric acid reduces said metal ion.

13. The process of claim 10 in which said solution is maintained at a pH within the range of about 1 to 6.

14. The process of claims 10 or 11 in which there are the further steps of removing said pre-formed polymeric substrate from said solution after graft copolymerization has occurred upon the surfaces thereof exposed to said solution, and introducing a second pre-formed polymeric substrate having peroxide groups, including hydroperoxide groups, along the polymer chains thereof into said solution to graft copolymerize said monomer onto the surfaces thereof.

15. The process of claim 14 in which there is the further step of replenishing squaric acid in said solution as the same is consumed by said process.

16. The process of claim 12 in which there is the preliminary step of treating said pre-formed polymeric substrate with high energy ionizing radiation or ozonation to produce said peroxide groups.

17. The process of claims 9, 10 or 11 in which said salt is the salt of a strong acid and strong base.

18. The process of claim 17 in which there is the preliminary step of treating said pre-formed polymeric substrate to high energy ionizing radiation or ozonation to produce said peroxide groups.

* * * * *